Aug. 21, 1956     R. P. HAWKINSON     2,759,220
TIRE TREADING MOLD
Filed May 4, 1953
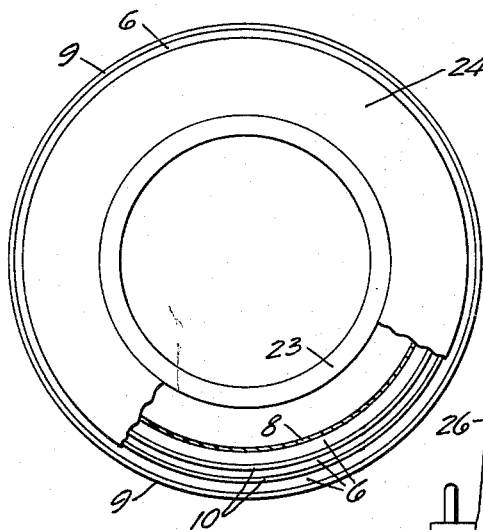
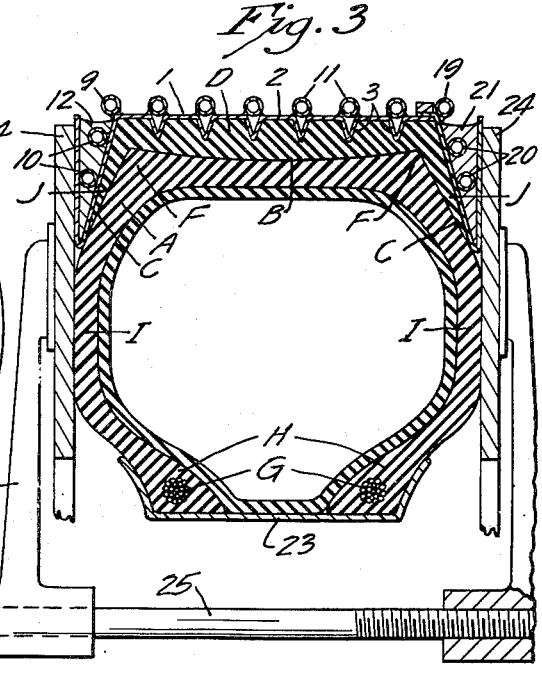
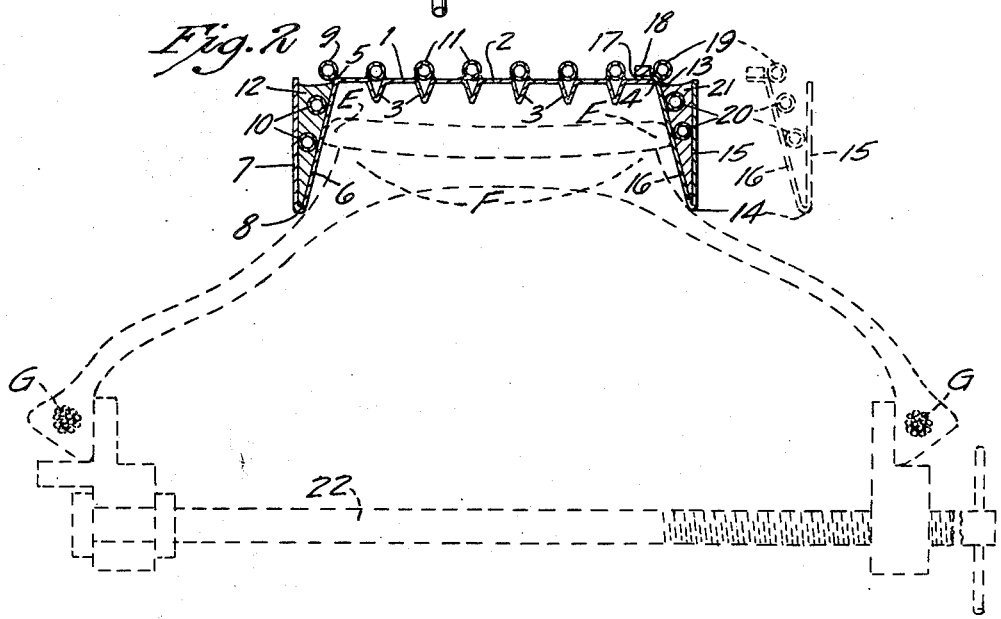
INVENTOR.
Raymond P. Hawkinson
BY
Merchant & Merchant
ATTORNEYS United States Patent Office 2,759,220
Patented Aug. 21, 1956

2,759,220

TIRE TREADING MOLD

Raymond P. Hawkinson, Minneapolis, Minn., assignor to Paul E. Hawkinson Company, Minneapolis, Minn., a corporation of Minnesota Application May 4, 1953, Serial No. 352,907

1 Claim. (Cl. 18—18)

My invention relates to the retreading of pneumatic tire casings, and more specifically to improvements in tire retreading matrices and methods of the type disclosed and claimed in Patents 1,917,261 (Re. 21,956) and 1,917,262, and known commercially as the "Hawkinson" method and apparatus.

As is well known, in practicing of the "Hawkinson" method of treading tires, an unbroken annular matrix of less diameter than the normal diameter of the worn tire to be treaded therein is utilized. The beads and side walls of the tire are spread mechanically so as to reduce the diametric measurements of the tire casing in order to enter the same into and remove the same from said unbroken annular matrix. Because of this fact, there is obviously a limit to the depth of the radially inwardly projecting circumferentially extended tread material confining flanges on opposite sides of the matrix—because there is a limit to the extent that one can and should reduce a tire diameter by the spreading of the beads thereof laterally. On the other hand, there is presently a demand for tire retreading matrices which have relatively deep tread material confining flanges and which, by virtue of said flanges, are capable of producing a better appearing new tread or retread.

The primary object of my invention is the provision of a matrix formed from sheet metal, which has tread material confining flanges of a depth too great to permit the tire casing, when reduced in circumference, to be passed therethrough, and which is made up of a pair of cooperating unbroken annular sections.

A further object of my invention is the provision of a device of the class immediately above described, wherein one of said cooperating sections includes one of said deep confining flanges and an integrally formed cylindrical band of a diameter less than that of the normal diameter of a worn tire casing to be treaded therein but sufficiently large to receive the road-engaging surface of said tire when the same has been reduced in circumference by spreading of the beads thereof.

A still further object of my invention is the provision of a device of the class immediately above described in which the other of said cooperating sections includes the other of said deep confining flanges and a cylindrical lip adapted to telescopically overlie the inner edge of the cylindrical band of the other of said sections.

A still further object of my invention is the provision of a device of the class generally above described which is relatively inexpensive to produce, is light in weight, easy to operate, is rigid and durable in construction, and which produces retreads of a high quality.

The above and still further objects of my invention will become apparent from the following detailed specification, appended claims, and attached drawings.

Referring to the drawings, wherein like characters indicate like parts throughout the several views:

Fig. 1 is a view in top plan of my novel tire retreading apparatus;

Fig. 2 is a view in vertical axial section of the retreading matrix utilized in my novel apparatus, and illustrating the method of inserting a tire to be treaded therein; and Fig. 3 is a view corresponding generally to Fig. 2, showing a different position of some of the parts and with some parts added so as to illustrate a further step in the method of curing a new tread on a worn pneumatic tire with my novel apparatus.

Referring with greater particularity to the drawings, the numeral 1 indicates the main section of my retreading matrix. As shown, section 1 is formed from sheet metal and includes an unbroken cylindrical band 2 having a plurality of axially spaced radially inwardly projecting tread design forming ribs 3 therein. Ribs 3 preferably are formed by pleating of the sheet material from which the band 2 is formed. The inner end 4 of the band 2 is spaced from the adjacent design forming rib 3. The outer end portion 5 of the band 2 is likewise spaced from the adjacent rib 3 and is bent radially inwardly, as at 6, and then backwardly upon itself, as at 7, to define and provide a relatively deep V-shaped tread material confining flange 8. To provide heating means for the main section 1, I spirally wind thereabout a tubular heating coil 9, the convolutions 10 of which are within the confining flange 8, and the convolutions 11 being on the outer peripheral surface of the band 2. Thereafter, the coil 9 is rigidly secured to the section 1 by solder or the like 12. Note that the solder 12 preferably has been caused to fill the space in the confining flange 8 in points not taken up by the convolutions 10.

Adapted to cooperate with the main section 1 is a supplemental section 13, which includes a confining flange 14 which in all respects matches the confining flange 8 and has its flat outer surface 15 in parallel relationship to the surface 7, for a purpose which will hereinafter become apparent. The angularly inwardly extending wall 16 of the confining flange 14 is bent axially inwardly at its upper end to provide a cylindrical lip 17, which, as shown, is adapted to telescopically overlie the inner edge portion of the cylindrical band 2 when same is moved from the dotted line to the full line position of Fig. 2. Also preferably and as shown, an endless reinforcing metal band 18 is firmly secured to the outer peripheral surface of the cylindrical rib 17. Independent heating means in the nature of an endless heating coil 19 is wound about the supplemental section 13, the convolutions within the confining flange 14 bearing the numeral 20. As in the case of the coil 9, the coil 19 is secured to supplemental section 13 by means of solder 21.

When it is desired to apply a new tread to a worn pneumatic tire casing with my novel structure, a casing of a suitable cross-sectional dimension for a given mold, and which has an overall diametrical measurement greater than the diametrical measurement of the cylindrical band 2, is chosen. By way of illustrating, a matrix, the cylindrical band 2 of which has a diametrical measurement of substantially 28½ inches, is chosen for a worn tire A having a normal overall diameter of substantially 30 inches. The tire A is then prepared by buffing the road-engaging surface B thereof and the upper side wall portion C on each side of the surface B. After applying cement to the buffed surfaces, B and C, a strip of uncured tread stock D is applied thereabout. Preferably and as shown, the tread stock D should have a width greater than the width of the buffed road-engaging portion B so as to leave portions E on opposite sides of the relatively thick shoulders F of the casing A. Thereafter, the tire casing A is reduced in circumference sufficiently by spreading the bead portions G thereof laterally at circumferentially spaced points by the use of mechanical spreaders or the like 22, all as described in greater particularity in Patent Re. 21,956. Thereafter, mold section 1 is moved to the position of Fig. 2, wherein the inner wall 6 of the confining flange 8 is in abutment with the portion E with the band 2 in radially outwardspaced relation to the newly applied tread rubber D. Next the supplemental mold section 13 is moved from the dotted line to the operative full line position of Fig. 2 with the confining flange 14 thereof also in engagement with its adjacent portion E of the tread rubber D. Then the spreader mechanism 22 is removed, and the beads G of the tire A are permitted to come together, thus forcing the crown portion B and newly applied tread rubber D radially outwardly with the latter coming into contact with the tread design forming ribs 3. The next step is the placing of inner tube H in the casing A and thereafter applying a conventional rim 23 to the beaded portions G. Thereafter, parallel clamping plates 24 are caused to engage the parallel surfaces 7 and 15 of the confining flanges 8 and 14, respectively, so as to prevent the sections 1 and 13 from being separated under the internal expanding pressure which is finally applied to the inner tube H prior to heat being applied to the mold through the independent heating elements 9 and 19. It will be noted that suitable clamping means, in the nature of a screw 25 working through arms 26, are utilized to bring the clamping plates 24 into operative position. Also preferably and as shown, the clamping plates 24 have a radial depth sufficient to enable them to bear upon the intermediate side wall portions I of the casing A during the curing operation so as to take the stress therefrom caused from internal expanding pressure applied within the inner tube H.

It will be noted that the radially innermost points of the confining flanges 8 and 14 bear upon the sides of the tire A immediately below the thick shoulders F so as to give the appearance of continuity to the newly applied tread rubber. Note particularly that the laterally projecting portions E of the tread stock D have been molded to form the downwardly tapering portions J.

I have found that treads cured in this manner not only are extremely pleasing in appearance, closely simulating the tread of a new tire, but also that a longer wearing "short tread," that is one that is cured at a diameter less than the normal diameter of a tire, can be produced, and without fear of buckling or otherwise causing harmful distortion of the carcass.

While I have disclosed a preferred embodiment of my invention, I wish it to be understood that same is capable of modification without departure from the scope of the appended claim.

What I claim is:

In a tire retreading mold, main and supplemental cooperating mold sections formed from sheet metal, said main section including a cylindrical band, the outer edge portion of said mold section being folded upon itself to form a generally V-shaped radially inwardly projecting tread material confining flange which is adapted to engage the upper side wall of a tire, said supplemental section including a V-shaped confining flange which matches the confining flange of said main section and a cylindrical lip adapted to telescopically overlie the inner edge of said cylindrical band, the outer surfaces of said confining flanges being parallel to each other, means rendering said flanges relatively rigid, independent heating means for each of said mold sections, and a pair of parallel clamping plates engageable with the outer substantially parallel surfaces of said confining flanges and adapted to engage the side walls of a tire casing within said mold sections radially inwardly of the confining flanges.

References Cited in the file of this patent

UNITED STATES PATENTS

| | | |
|---|---|---|
| 2,155,906 | Rihn et al. | Apr. 25, 1939 |
| 2,475,579 | Napier | July 5, 1949 |
| 2,479,474 | Crooker | Aug. 16, 1949 |